US011025991B2

(12) United States Patent
Yin

(10) Patent No.: US 11,025,991 B2
(45) Date of Patent: Jun. 1, 2021

(54) WEBPAGE PLAYING METHOD AND DEVICE AND STORAGE MEDIUM FOR NON-STREAMING MEDIA FILE

(71) Applicant: Beijing Bytedance Network Technology Co., Ltd., Beijing (CN)

(72) Inventor: Guohui Yin, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/012,172

(22) Filed: Sep. 4, 2020

(65) Prior Publication Data

US 2020/0413146 A1 Dec. 31, 2020

Related U.S. Application Data

(63) Continuation of application No. PCT/CN2018/103543, filed on Aug. 31, 2018.

(30) Foreign Application Priority Data

May 29, 2018 (CN) .......................... 201810532849.1

(51) Int. Cl.
*H04N 21/4782* (2011.01)
*H04N 21/472* (2011.01)
*H04N 21/858* (2011.01)

(52) U.S. Cl.
CPC ... H04N 21/4782 (2013.01); H04N 21/47202 (2013.01); H04N 21/8586 (2013.01)

(58) Field of Classification Search
CPC ......... H04N 21/4782; H04N 21/47202; H04N 21/8586
See application file for complete search history.

(56) References Cited

U.S. PATENT DOCUMENTS

2002/0069218 A1* 6/2002 Sull ...................... G11B 27/034
715/202
2007/0088844 A1* 4/2007 Seims ................ H04N 21/2225
709/231
(Continued)

FOREIGN PATENT DOCUMENTS

CN 102004760 A 4/2011
CN 102143121 A 8/2011
(Continued)

OTHER PUBLICATIONS

International Patent Application No. PCT/CN2018/103543; Int'l Search Report; dated Mar. 5, 2019; 2 pages.

*Primary Examiner* — Nasser M Goodarzi
*Assistant Examiner* — Adil Ocak
(74) *Attorney, Agent, or Firm* — BakerHostetler

(57) ABSTRACT

The disclosure provides a webpage playing method and device for a non-streaming media file and a storage medium. The method includes part of a media data in a media file is obtained based on two key frames of the media file played in a webpage with an embedded player, the media file is in a non-streaming media format; a segmented media file is constructed based on media data between the two key frames; the constructed segmented media file is added to a media source object in a media resource extension interface; and a virtual address is delivered to media elements of the webpage, wherein the virtual address is used for the media elements to play with the media source object as a data source.

20 Claims, 8 Drawing Sheets

(56) References Cited

U.S. PATENT DOCUMENTS

2012/0002947 A1    1/2012  Rhyu et al.
2012/0296882 A1*  11/2012  Lee .................... G06F 16/70
                                                707/693
2014/0149553 A1*   5/2014  Bank ................ H04L 65/602
                                                709/219

FOREIGN PATENT DOCUMENTS

| | | |
|---|---|---|
| CN | 102340705 A | 2/2012 |
| CN | 106937176 A | 7/2017 |
| CN | 107613029 A | 1/2018 |
| JP | 2001-057570 A | 2/2001 |
| JP | 2013-521691 A | 6/2013 |
| JP | 2014-509109 A | 4/2014 |
| JP | 2016-026427 A | 2/2016 |
| WO | WO 2012/097006 A1 | 7/2012 |

* cited by examiner

WEBPAGE PLAYING METHOD AND DEVICE AND STORAGE MEDIUM FOR NON-STREAMING MEDIA FILE

CROSS-REFERENCE TO RELATED APPLICATIONS

The present application is a continuation of PCT application Ser. No. PCT/CN2018/103543, filed on Aug. 31, 2018, which is filed on the basis of and claims the benefit of priority from Chinese Patent Application No. 201810532849.1 filed at May 29, 2018, the entire contents of which are incorporated herein by reference.

TECHNICAL FIELD

The disclosure relates to a media playing technology, in particular to a webpage playing method and device and a storage medium for a non-streaming media file.

BACKGROUND ART

When a media file is played in a webpage, the webpage preloads subsequent media data based on the current play point until all the media data from the current play point to the end time are loaded.

According to loading strategies of different webpages, when the play point skips, some webpages are reloaded based on a new play point, and some webpages may reuse retrieved media data.

In fact, a user often makes a playing progress skip during playing the media files. Therefore, regardless of which loading strategy of the prior art is adopted, unnecessary consumption of traffic and bandwidth by preloaded media data leads to delay of other services in the webpage.

SUMMARY

Therefore, the embodiment of the disclosure provides a webpage playing method and device for a non-streaming media file and a storage medium, which can avoid unnecessary consumption of traffic and bandwidth and ensure real-time performance of other services in the webpage.

In the first aspect, an embodiment of the disclosure provides a webpage playing method for non-streaming media files comprising: acquiring a part of media data in a media file based on two key frames of the media file played in webpage; wherein the media file is in a non-streaming media format; constructing a segmented media file based on the media data between the two key frames; adding the constructed segmented media file to a media source object in a media resource extension interface; delivering a virtual address to a media element of the webpage, wherein the virtual address is used for the media element to play with the media source object as a data source.

In the second aspect, an embodiment of the disclosure provides a webpage playing device for non-streaming media files comprising: an acquisition unit configured to acquire part of a media data of a media file based on two key frames of the media file played in webpage, and the media file is in a non-streaming media format; a construction unit configured to construct a segmented media file based on the media data between the two key frames; an adding unit configured to add the segmented media file constructed to a media source object in a media resource extension interface; a transmission unit configured to deliver a virtual address to a media element of the webpage, the virtual address is used for the media element to play with the media source object as a data source.

In the third aspect, an embodiment of the disclosure provides a webpage playing device for non-streaming media files comprising: memory configured to store executable instructions; a processor configured to implement the webpage playing method for the non-streaming media file of the embodiment of the disclosure when executing the executable instructions stored in the memory.

In the fourth aspect, an embodiment of the disclosure provides a storage medium for storing an executable instruction, which is used to implement the webpage playing method for the non-streaming media file of the embodiment of the disclosure when the executable instruction is executed.

The application of embodiments of the disclosure has the following beneficial effects.

1) The player acquires part of media data between two key frames of the media file to construct and play a segmented media file, so that the media data loading is controlled in the process of playing the media file to avoid unnecessary consumption of the traffic and bandwidth.

2) The media data in the media file in a non-streaming media format is converted into a segmented media file, and the segmented media file is sent to media elements of the webpage via a media source extension interface of the webpage for decoding and playing, so that the media file in the non-streaming media format is played by the webpage, and the limitation that the non-streaming media files in a encapsulation format can be independently played only after being completely downloaded is overcome.

3) The encapsulated segmented media file is based on part of the media data of the acquired media file instead of all data of the media file, so that the conversion delay is small, pre-storage is not needed, extra storage space is not occupied except the original media file, and the occupation of the storage space is remarkably reduced.

4) The media elements of the webpage acquire the segmented media file via the media source extension interface for decoding and playing, rather than acquiring media data and then playing based on the real address of the media file, and the protection for the real address of the media file is realized.

DETAILED DESCRIPTION

Figure 1:
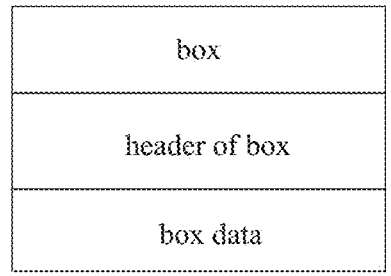
FIG. 1 is a schematic diagram of an alternative structure of a box provided by an embodiment of the present disclosure.

The present disclosure will be further described in detail below in combination with the accompanying drawings and embodiments. It is to be understood that the embodiments provided herein are only for the purpose of interpreting the disclosure and are not intended to limit. In addition, the embodiments provided below are for implementing some embodiments of the present disclosure, rather than all embodiments of the present disclosure. The technical solutions described in the embodiments of the present disclosure can be implemented in any combination without conflict.

It should be noted that in the embodiments of the present disclosure, the terms "including", "including" or any other derivation thereof are intended to cover non-exclusive inclusion, so that a method or device including a series of elements includes not only the explicitly described elements, but also other elements not explicitly listed, or the inherent requirements for implementing method or device. Without further restrictions, the element defined by the statement "include a . . . " does not exclude that there are other relevant elements in the method or device including the element (for example, steps in the method or units in the device, for example, the unit may be part of a circuit, part of a processor, part of a program or software, etc.).

For example, the webpage playing method for the non-streaming media file provided by the embodiment of the disclosure includes a series of steps, but the webpage playing method of the non-streaming media file provided by the embodiment of the disclosure is not limited to the described steps. Similarly, the webpage playing device for the non-streaming media file provided by the embodiment of the disclosure includes a series of units, but the device provided by the embodiment of the disclosure is not limited to include the explicitly described units, but also includes the unit required for acquiring relevant information or processing based on information.

Unless otherwise defined, all technical and scientific terms used herein have the same meanings as those generally understood by those skilled in the art. The terms used herein are for the purpose of describing specific embodiments only and are not intended to limit the disclosure.

Prior to the further detailed description of the embodiments of the disclosure, the terms and expressions involved in the embodiments of the disclosure are described. The terms and expressions involved in the embodiments of the disclosure are as follows.

1) media file, a file storing encoded media data (such as at least one of audio data and video data) in a box (also known as a cassette), which also includes metadata, that is, data describing media data, which contains media information to ensure that media data is decoded correctly.

For example, a media file formed by encapsulating multimedia data in the format of moving picture experts group (MPEG)-4 is called an MP4 file. Typically, the MP4 file stores video data encoded by advanced video coding (AVC, i.e. H.264) or MPEG-4 (Part 2) specifications and audio data encoded by advanced audio coding (AAC) specifications, of course, does not exclude other encoding methods of video and audio.

2) A box, also known as a cassette, is an object-oriented component defined by a unique type identifier and length. See FIG. 1, it is an optional structural diagram of the box provided by the embodiment of the present disclosure, including a box header and a box data, which are filled with binary data useful for indicating various information.

The box header includes the size and the type. The size indicates the size of the storage space occupied by the box (also referred to as the capacity or length herein). The type indicates the type of the box. See FIG. 2, it is an optional encapsulated structure diagram of the MP4 file provided by the embodiment of the present disclosure. The basic box type involved in the MP4 file includes the file type box (ftyp box), metadata box (moov box) and media data box (mdat box).

The box data part can store specific data. At this time, the box is called "data box". The box data part can further encapsulate other types of boxes. At this time, the box is called "box of box".

3) Track, also known as stream, refers to the related sample sorted by time in the media data box. For media data, track represents a video frame sequence or an audio frame sequence, and can also include a subtitle track synchronized with the video frame sequence. A group of continuous sample in the same track is called chunk.

Figure 2:
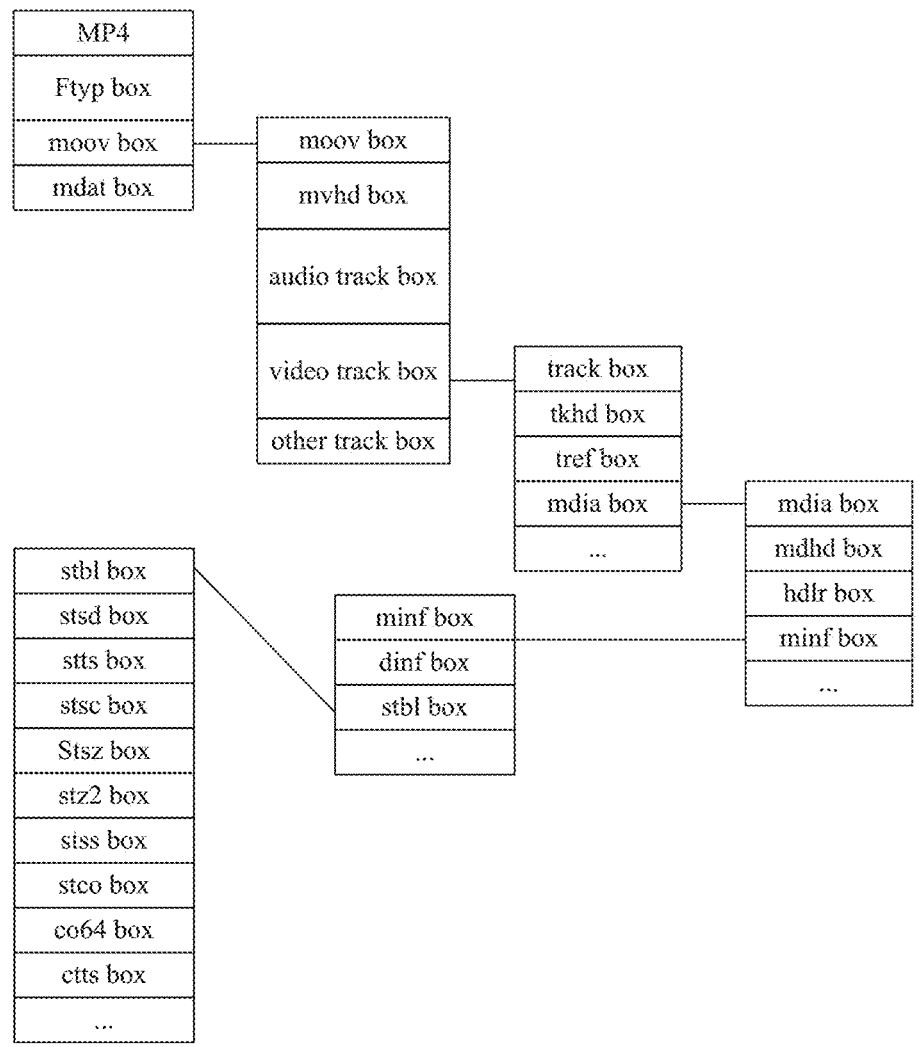
FIG. 2 is a schematic diagram of an alternative encapsulated structure for an MP4 file provided by an embodiment of the present disclosure.

4) file type box, which is used to store the size (i.e. the length of bytes occupied) and type of files in media files, as shown in FIG. 2, the binary data stored in the file type box describes the type and size of the box according to the byte length of the specification.

5) Metadata box, which is used to store metadata (i.e. data describing multimedia data stored in media data box) in media file. The information expressed by binary data stored in metadata box in MP4 file is called media information.

As shown in FIG. 2, the header of the metadata box uses binary data to indicate that the type of the box is "moov box". The box data part encapsulates the mvhd box used to store the overall information of the MP4 file, which is independent of the MP4 file and related to the playing of the MP4 file, including the time length, creation time, modification time, etc.

The media data box of the media file may include sub-boxes corresponding to multiple tracks, such as audio track box and video track box. In the sub-boxes of the audio track box and video track box, the reference and description of the media data of the corresponding tracks are included. The necessary sub-boxes include: the box for describing the characteristics and overall information (such as time length, width, height) of the tracks (described as tkhd box), the box for recording media information (such as media type and sample information) of the track (described as mdia box).

As far as the sub-boxes encapsulated in the mdia box are concerned, they may include: boxes for recording the relevant attributes and contents of the track (described as mdhd box), boxes for recording the information of the playing process of the media (described as hdlr box), boxes for describing the media information of the media data of the track (described as minf box); a sub-box for explaining how to locate the media information (described as dinf box), and a sub-box for recording all time information (decoding time/display time), position information, encoding and decoding and other information of sample in the track (described as stbl box) are encapsulated in the minf box.

Figure 3:
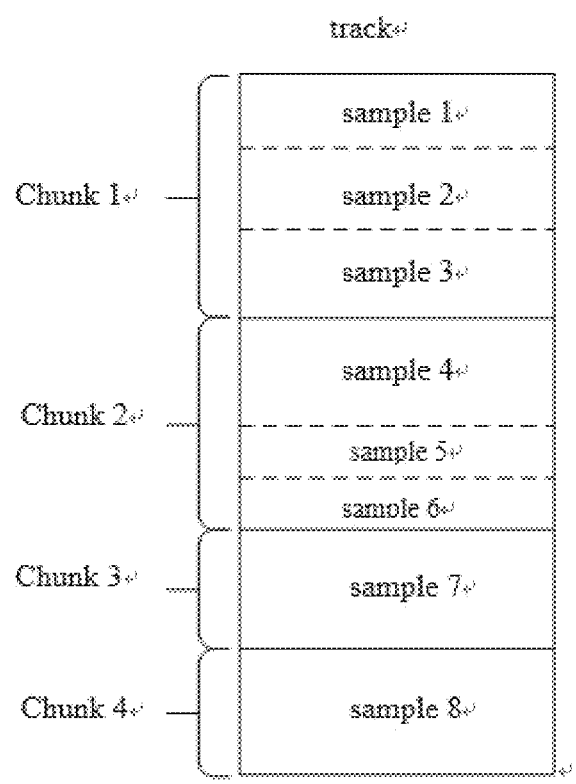
FIG. 3 is a schematic diagram showing a structure in which a media data box stores media data in a media file provided by an embodiment of the present disclosure.

Referring to FIG. 3, it is a structural diagram of the media data box in the media file provided by the embodiment of the disclosure to store the media data. Using the media information recognized from the binary data in the stbl box, it is possible to explain the sample time, type, size and position in the media data box. Each sub-box in the stbl box is described below.

A stsd box contains a sample description table. According to different encoding schemes and the number of files of stored data, each media file can have one or more description tables. The description information of each sample can be found via the description table. The description information can ensure the correct decoding of the sample. Different media types store different description information, for example, for video media, description information is the structure of image.

Stts box stores the time information of the sample, and provides tables to map time (decoding time) and sequence number of the sample. Through sttx box, sample in the media file at any time can be located; other tables are used to map size of sample and pointer in stts box. Each entry in the table provides continuous sequence number of sample and sample offset in the same time offset. To increase these offsets, a complete time-sample mapping table can be established. The calculation formula is as follows:

$$DT(n+1)=DT(n)+STTS(n) \quad (1)$$

Where STTS(n) is the nth information of STTS without compression, DT is the display time of nth sample, and the sample is arranged in the order of time, so that the offset is always non negative, DT generally starts with 0, and calculation formula of DT is as follows:

$$DT(i)=SUM(\text{for } j=0 \text{ to } i-1 \text{ of delta}(j)) \quad (2)$$

The sum of all offsets is the length of media data in the track.

The stss box records the sequence number of the key frames in the media file.

Stsc box records the mapping relationship between the sample and chunk storing the sample, maps the relationship between sequence number of the sample and sequence number of the chunk through tables, and finds the chunk containing the specific sample by looking up tables.

Stco box defines the position of each chunk in the track, which is represented by the offset of the start byte in the media data box and the length (i.e. size) relative to the start byte.

Stsz box records the size of each sample in the media file.

6) Media data box, which is used to store multimedia data in media files. For example, media data box in MP4 file, as shown in FIG. 3, sample is the unit stored in media data box, stored in the chunk of media file, and the length of chunk and sample may be different from each other.

7) Segmented media files, which is the sub files that media files are divided into. Each segmented media file can be decoded independently.

Taking MP4 file as an example, the media data in MP4 file is separated according to the key frame. The separated media data and corresponding metadata are encapsulated to form segmented MP4 (FMP4) file. The metadata in each fmp4 file can ensure that the media data is decoded correctly.

Figure 4:
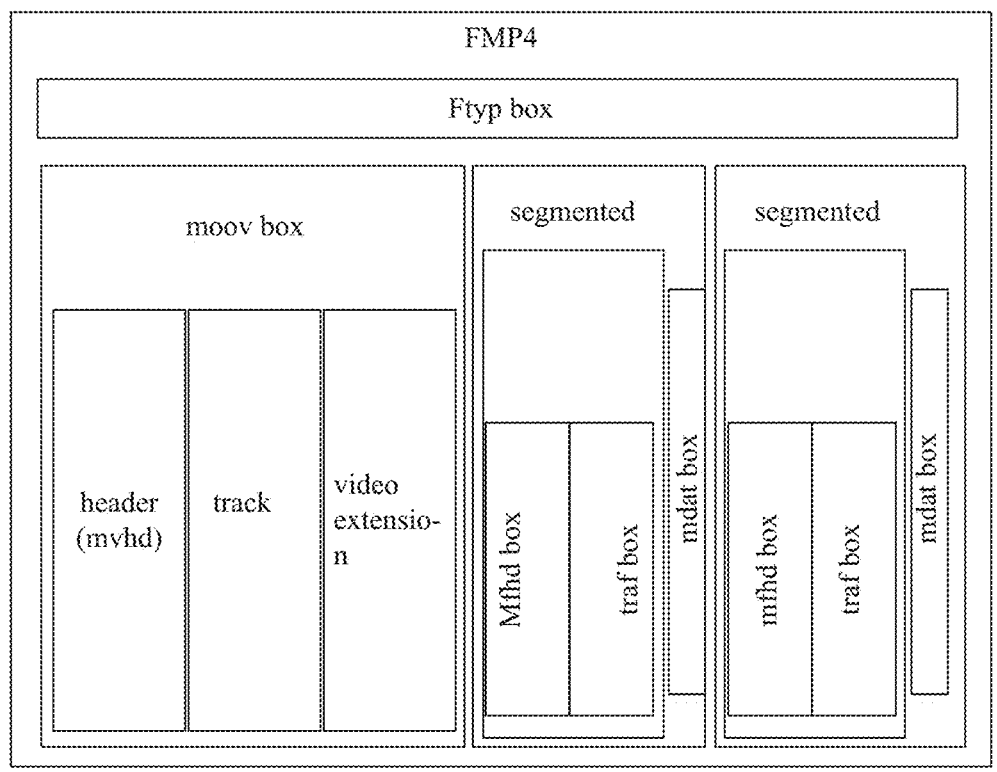
FIG. 4 is a schematic diagram of an alternative encapsulated structure for a segmented MP4 file provided by an embodiment of the present disclosure.

For example, when converting the MP4 file shown in FIG. 2 to multiple fmp4 files, refer to FIG. 4, which is schematic diagram of an optional packaging structure of the segmented MP4 (FMP4) file provided by the embodiment of the present disclosure. One MP4 file can be converted to multiple fmp4 files, and each FMP4 file includes three basic boxes: a moov box, a moof box, and a mdat box.

The moov box includes metadata of MP4 file level, which is used to describe all the media data in MP4 file from which FMP4 file comes, such as the time length of MP4 file, creation time and modification time, etc.

The moof box stores metadata of segmented level, which is used to describe the media data encapsulated in the FMP4 file to ensure that the media data in the fmp4 can be decoded.

One moof box and one mdat box constitute one segment of segmented MP4 file. One segment MP4 file may include one or more such segments. The metadata encapsulated in each segment ensures that the media data encapsulated in the segment can be decoded independently.

8) media source extensions (MSE) interface, a player oriented interface implemented in webpages, is implemented during the loading of webpages by interpreting and executing the front-end programming language (such as JavaScript) through the browser's interpreter, providing the player with the function of calling the play media stream of hypertext markup language (HTML) media element, for example, video element <video> and audio element <audio> are used to play video/audio.

9) Streaming media format, which encapsulates media data as media files of streaming media. Media files can be decoded and played without complete download or extra transcoding. That is, the encapsulation technology of downloading and playing at the same time is natively supported. Files in typical streaming media format include: TS media file segmentation based on HTTP live streaming technology, LV (flash video) files, etc.

10) non-streaming media format, a packaging technology that encapsulates media data as media files and media files can be decoded and played only after they are completely downloaded. Files in typical non-streaming media format include: MP4 files, Windows Media Video (WMV) files, MKV file format, Advanced Streaming Format (ASF) files, etc.

It should be pointed out that MP4 file does not natively support playing in streaming media format, but it can be realized that it is played while being downloaded by filling the media stream transcoded by player after online transcoding, or the missing part of partially downloaded MP4 file with invalid binary data (for example, filling the missing part of mdat box with invalid binary data when ftyp box and moov box are completely downloaded), the encapsulation format of the file that does not natively support streaming media play herein is called non-streaming media format.

A loading control device for realizing media playing provided by the embodiment of the disclosure is first described, which can be implemented as various types of user terminals such as smart phones, tablet computers, notebook computers and the like. In the following, an exemplary application covering the user terminal when the device is implemented as a user terminal will be described.

Figure 5:
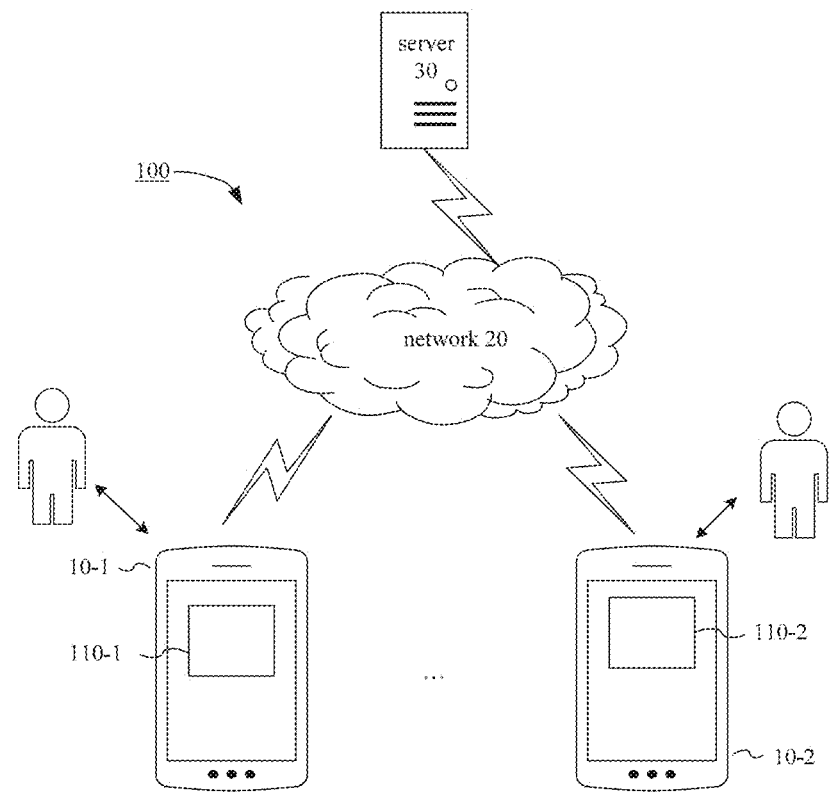
FIG. 5 is an architectural diagram of a loading control system for media playing provided by an embodiment of the present disclosure.

Referring to FIG. 5, it is an alternative architectural diagram of a loading control system 100 for media playing provided by an embodiment of the present disclosure. A user terminal 10 (exemplary user terminal 10-1 and user terminal 10-2 as shown) is connected to a server 30 via a network 20, which may be a wide area network or a local area network, or a combination of both, for supporting an exemplary application. Data transmission is realized by using wireless links.

A user terminal 10 plays a media file by a webpage embedded with a player and displays the played content by a graphical interface 110 (exemplary graphical interface 110-1 and graphical interface 110-2 as shown); the playing process includes acquiring by the user terminal 10 part of media data of the media file from a server 30 based on two key frames of the media file in a non-streaming media format, and constructing a segmented media file based on the media data between the two key frames; adding the constructed segmented media file to a media source object in a media resource extension interface; and delivering a virtual address to the media elements of the webpage, wherein the virtual address is used for the media elements to play with the media source object as a data source.

Next, a description will be given to a webpage playing device for a non-streaming media file according to an embodiment of the present disclosure, which may be provided in hardware, software, or a combination of hardware and software.

Figure 6:
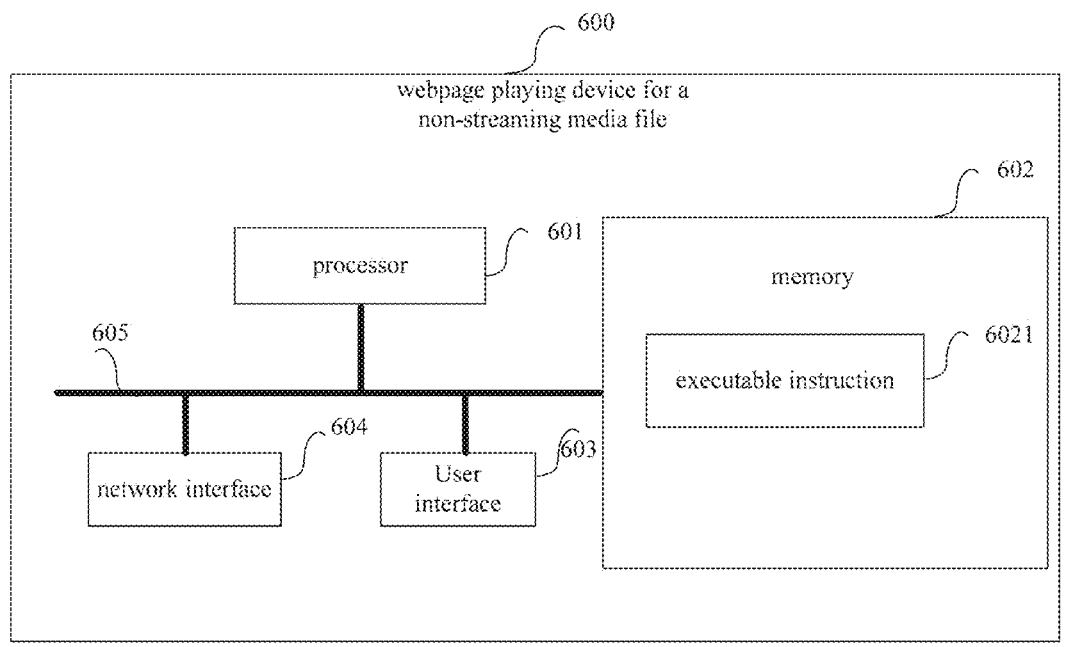
FIG. 6 is a schematic diagram I showing a composition structure of a webpage playing device for a non-streaming media file provided by an embodiment of the present disclosure.

An implementation of a software-hardware combination of the webpage playing device for the non-streaming media file is described below; with reference to FIG. 6, it is a schematic diagram of an alternative composition structure of a webpage playing device for a non-streaming media file provided by an embodiment of the present disclosure. The hardware structure of the webpage playing device for the non-streaming media file of the embodiment of the present disclosure will be described in detail below. It will be understood that FIG. 6 shows only an exemplary structure of the webpage playing device for the non-streaming media file and not the entire structure, and that some or all of the structure shown in FIG. 6 may be implemented as required.

The webpage playing device 600 for the non-streaming media file provided by the embodiment of the present disclosure includes at least one processor 601, a memory 602, a user interface 603, and at least one network interface 604. The various components in the webpage playing device 600 for the non-streaming media file are coupled together by a bus system 605. It will be appreciated that the bus system 605 is configured to enable connection communication between these components. The bus system 605 includes, in addition to a data bus, a power bus, a control bus, and a status signal bus. However, for clarity of illustration, the various buses are labeled as the bus system 605 in FIG. 6.

The user interface 603 may include, among other things, a display, a keyboard, a mouse, a trackball, a click wheel, keys, buttons, a touch pad, or a touch screen.

It will be appreciated that a memory 602 may be a volatile memory or a nonvolatile memory, and may include both volatile and nonvolatile memory.

The memory 602 in embodiments of the present disclosure is configured to store various types of data to support the operation of a webpage playing device 600 for a non-streaming media file. Examples of such data include any executable instructions for operating on the webpage playing device 600 for the non-streaming media files, such as executable instructions 6021; and a program implementing the webpage playing method for the non-streaming media files of the embodiments of the present disclosure may be included in the executable instructions 6021.

The webpage playing method for the non-streaming media files disclosed by the embodiment of the present disclosure can be applied to or implemented by the processor 601. The processor 601 may be an integrated circuit chip having signal processing capabilities. In implementation, the steps of the webpage playing method for the non-streaming media files may be performed by integrated logic circuitry in hardware or instructions in the form of software in the processor 601. The processor 601 may be a general purpose processor, a digital signal processor (DSP), or other programmable logic devices, discrete gates or transistor logic devices, discrete hardware components, etc. The processor 601 may implement or perform various methods, steps, and logic block diagrams disclosed in the embodiments of the present disclosure. The general-purpose processor may be a microprocessor, any conventional processor, etc. The steps of the method disclosed in combination with the embodiments of the present disclosure may be embodied directly as being performed by a hardware decoding processor or performed by a combination of hardware and software modules in the decoding processor. The software module may be positioned in a storage medium positioned in the memory 602, and the processor 601 reads the information in the memory 602 to complete the steps of the webpage playing method for the non-streaming media files provided by the embodiments of the present disclosure in conjunction with hardware thereof.

A hardware-only implementation of a webpage playing device for a non-streaming media file is described below. A webpage playing device implementing non-streaming media files of embodiments of the present disclosure may be implemented by one or more application specific integrated circuits (ASICs), digital signal processing (DSP), programmable logic devices (PLDs), programmable logic devices (CPLDs), complex programmable logic devices (CPLDs), field-programmable gate arrays (FPGAs) or other electronic elements, and is configured for executing a webpage playing method for implementing the non-streaming media files provided by the embodiments of the disclosure.

A software-only implementation of a webpage playing device for a non-streaming media file is described below. A webpage playing device for implementing non-streaming media files of embodiments of the present disclosure may be an application program or a plug-in, or a combination of both.

As an example, the application program may be a client dedicated to playing media files, or a client having a media file playing function as an optional function, which is implemented by installing a corresponding plug-in.

As an example, the plug-in can be implemented as a function upgrade installation package of an application program, to superpose media file playing function in a specific application program; the plug-in can also be an element in a webpage for media playing, which is realized by adopting a front-end language, with a function of media file playing in the webpage by being directly interpreted and executed by the webpage.

Next, taking a player embedded in a webpage and the player playing a media file using a HyperText Markup Language (HTML) 5 media elements of the webpage as an example, the webpage playing method for the non-streaming media files provided by the embodiment of the present disclosure is explained, wherein the webpage in the embodiment of the present disclosure can be either a webpage of a browser or a webpage of an application (APP) within which a browser kernel is embedded, and the player instance is implemented by parsing and executing the player's JS (JavaScript) code in the webpage.

Figure 7:
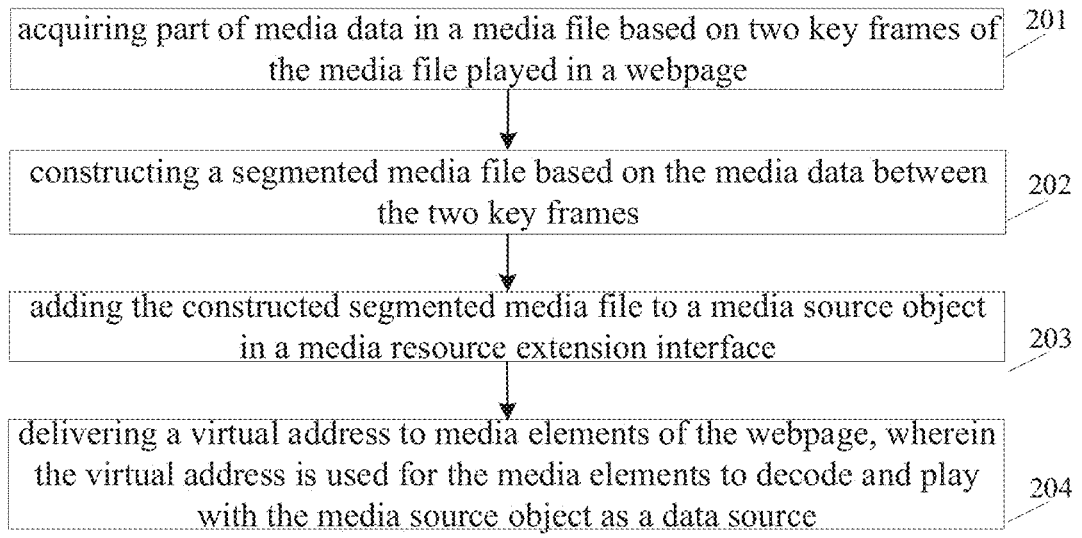
FIG. 7 is a flow diagram I showing a webpage playing method for a non-streaming media file provided by an embodiment of the present disclosure.

FIG. 7 illustrates an alternative flow diagram of a webpage playing method for a non-streaming media file provided by an embodiment of the present disclosure. Referring to FIG. 7, the webpage playing method for the non-streaming media file provided by the embodiment of the present disclosure involves steps 201-204, which are described below, respectively.

Step 201: acquiring part of media data in a media file based on two key frames of the media file played in a webpage.

Here, the media file played in the webpage adopts a non-streaming media format, such as MP4/MKV/WMV/ASF encapsulation formats, and the media data in the embodiment of the present disclosure refers to at least one of a video frame and an audio frame in a media data box of the media file.

In one embodiment, the player may obtain part of media data in the media file as follows: determining by a player two key frames in a media file based on a real-time play point in the playing process of the media file; and sending a network request to a server for requesting acquisition of media data between the two key frames in the media file.

The determination for the two key frames based on the play point is described. In the process of playing the media file, the player plays the media file by loading data between the key frames, that is, the player takes the media data between the two key frames as a playing load unit. As for the play point, the play point can be a play time reached by continuously playing the media file (i.e. naturally playing without intervention by the user), for example, a play point from the 30th minute to the 40th minute; it is also possible to reach the play time when the media file arrives by means of skipping (i.e. the user clicks a progress bar via a cursor to realize page skipping), for example, the original play point is 20% of the playing progress, and the play point after being skipped is 30% of the playing progress.

In practical application, two key frames determined based on the play point can be two adjacent key frames in the media file, or one or more other key frames exist between the two key frames, and the number of the key frames between the two key frames can be determined according to the caching performance (such as the available caching capacity) of the browser, the network performance (the network bandwidth) and the like, and can also be set according to practical requirements.

In one embodiment, according to the case where the video frame corresponding to the play point is a general frame or a key frame, the manner of determining the two key frames (set as a first key frame and a second key frame having a decoding time after the first key frame) is described with respect to the case where the play point arrives at the play time by playing the media file continuously.

Case 1) the video frame corresponding to the play point is a general frame, and since the player takes the media data between two key frames as a basic play load unit, the media data after the play point and before the first key frame (a key frame closest to the play point in the key frames later than the play point in decoding time) is loaded media data; in order to avoid repeatedly acquiring the part of loaded media data, the first key frame of the two key frames of a given time period is a first key frame having decoding time after the play point in the media file; the second key frame of the two key frames is a key frame having a decoding time later than the first key frame in the media file.

Case 2) the video frame corresponding to the play point is a key frame, and the first key frame of the two key frames is a key frame corresponding to the play point, namely the key frame aligned with the play point in time; the second key frame of the two key frames is a key frame in the media file having a decoding time later than the first key frame.

In the above-mentioned case 1), taking the key frame crossing the play point as an end point of the media data, it can be ensured that the video frame corresponding to the play point has sufficient information for correct decoding without skipping the frame due to the lack of decoding data (i.e. the key frame).

In another embodiment, according to the case where the video frame corresponding to the play point is a general frame or a key frame, the manner of determining the two key frames (set as a first key frame and a second key frame having a decoding time after the first key frame) is described with respect to the case where the play point arrives at the play time by means of skipping.

Case 1) the video frame corresponding to the play point is a general frame, and since the play point is reached by skipping, the media data between the first key frame before the play point and the play point is not loaded; the first key frame is a first key frame having decoding time before the play point in the media file, namely a key frame having a decoding time, earlier than the start time of a given time period and closest to the start time, searched from the time of the media data (i.e. the corresponding relationship between the serial number represented by the media information and the decoding time of the frame); the second key frame of the two key frames is a key frame having a decoding time later than the first key frame in the media file. The media data between the play point and the key frames before the play point is additionally requested, so that normal decoding can be guaranteed when skipping to any play point, and the situation that the play point skips frames because the play point cannot be decoded when corresponding to a general frame is avoided.

Case 2) the video frame corresponding to the play point is a key frame, and the first key frame is a key frame corresponding to the play point, namely the key frame having a decoding time, aligned with the play point time, searched from the time of the media data (i.e. the corresponding relationship between the serial number represented by the media information and the decoding time of the frame); the second key frame of the two key frames is a key frame having a decoding time later than the first key frame in the media file.

In the above-mentioned case 1), taking the key frame crossing the play point as an end point of the media data, it can be ensured that the video frame corresponding to the play point has sufficient information for correct decoding without skipping the frame due to the lack of decoding data (i.e. the key frame).

In case 2), the media data to be acquired is defined by the key frames aligned with the play points; on the premise that the play points can be decoded correctly, the situation of acquiring unnecessary media data is reduced to the maximum extent, the occupation of connection and traffic is reduced, and the real-time performance of non-media playing services in the webpage is further guaranteed.

In one embodiment, a network request sent by the player to the server carries the offset and size of the requested media data between the two key frames, so that the server positions the media data in the requested media file based on the offset and size after parsing the network request, extracts the media data starting from the offset and conforming to the size from the media file, and returns the media data to the player. Therefore, before sending the network request, the player needs to determine the offset and size of the media data in the media file according to the media information of the media file (i.e. information about the position, offset, decoding time, etc. of the video/audio frame). Before determining the offset and size, media information is first identified from the media file's metadata.

Next, the identification of the player on media information will be described. In one embodiment, the player may identify media information from the media file in the following manner according to the set offset and size, requesting data in the media file corresponding to the set offset and size from the server (i.e. requesting the data with a fixed size), identifying metadata in the metadata box from the data returned by the server, and parsing the identified metadata to obtain media information used for describing the media data encapsulated in the media data box of the media file.

Herein, the set size can be obtained according to the size statistics of the file type box and the metadata box of the existing media file, so that the set size can cover the sum of the size of the file type box and the metadata box of a set proportion (e.g. all) of the media files; and when the encapsulated structure of the media file is file type box, the metadata box and the media data box which are sequentially encapsulated, the metadata encapsulated in the complete metadata box can be obtained by one-time request, so that the occupation condition of the connection is saved during network transmission, avoiding the situation that the response is delayed due to the fact that the connection cannot be used for non-media playing services in the webpage on account of the occupation of the connection.

Taking the media file MP4 file as an example, metadata encapsulated in a metadata box acquired by a player is binary data encapsulated in a moov box in the MP4 file; and when the encapsulated structure of the MP4 file is the sequentially encapsulated fytp box, moov box and mdat box, the set size can be obtained according to the statistics of the ftyp box and moov box size of the existing MP4 file, enabling the set size to cover the sum of binary data of the ftyp box and the moov box of a set proportion (e.g. all) of MP4 file, and ensuring that the complete binary data can be requested from the server to be included in the moov box in most cases once.

In one embodiment, in binary data requested by a player from a server by a set offset and size, a piece of binary data starting from zero bytes corresponds to a file type box; the player obtains the size of the file type box by reading the header of the box, and knows the type and size of the next box by reading the header of the second box; when the type of the second box is a metadata box, and the size of the returned binary data is not smaller than the sum of the size of the file type box and the size of the metadata box, it is indicated that the binary data requested from the server by the set offset and size comprises the metadata encapsulated in the metadata box; and when the type of the second box is a metadata box and the size of the returned binary data is smaller than the sum of the size of the file type box and the size of the metadata box, it is indicated that the binary data requested from the server by the set offset and size does not contain the metadata encapsulated in the metadata box. When the binary data requested by the player from the server by the set offset and size does not contain the metadata in the complete metadata box, the player needs to read the size of the box from the binary data returned by the server, calculates the offset and size of the metadata box according to the header of the metadata box, and carries the calculated offset and size in a network request to request the metadata from the server; and the server reads binary data from the offset calculated in the media file according to the request, the read binary data conforms to the calculated size, and the data are returned to the player.

As an example, the player reads the size of the box from the binary data returned by the server, and calculates the offset and size of the metadata box according to the header of the metadata box, relating to the following two cases.

Case 1) when the type of the box read from the remaining binary data (i.e., the data other than the binary data of the file type box in the returned binary data) is a metadata box, and the size of the remaining binary data is smaller than the size of the metadata box, the difference between the size of the metadata box and the size of the remaining binary data is calculated as the new size of the secondary request, and binary data is requested from the server for the second time by taking the sum of the offset and size requested for the first time as a new offset;

Case 2) when the type of the box read from the remaining binary data is a media data box, the sum of the size of the media data box and the size of the file type box is calculated as a new offset of the secondary request, and the binary data is requested from the server for a second time at a set size (which may be an empirical value capable of covering the size of the metadata box).

Taking the media file MP4 file as an example, the binary data requested by the player from the server by the set offset and size does not contain the binary data of the complete moov box; and at the moment, the player needs to read the type and size of the box from the binary data returned by the server to determine the offset and size of the moov box in the MP4 file;

according to the binary data of the MP4 file, the starting byte always corresponds to the ftyp box, the binary data of the fytp box is identified from the returned binary data, and the length of the fytp box can be known according to the header of the ftypbox, so that the binary data of the next box is read from the remaining binary data according to the standard length of the header; and the box type represented by the header includes the following situations:

1) when the type of the box read from the remaining binary data (i.e., the data other than the binary data of the fytp box in the returned binary data) is a moov box, and the size of the remaining binary data is not smaller than the size of the moov box, according to the determined offset and size, the moov data, starting with the offset of the moov box in the MP4 file and conforming to the size of the moov box in the MP4 file, is acquired from the server;

2) when the type of the box read from the remaining binary data is a moov box, and the size of the remaining binary data is smaller than the size of the moov box, the difference between the size of the moov box and the size of the remaining binary data is calculated as the new size of the secondary request, and the binary data is requested from the server for the second time by taking the sum of the offset and size requested for the first time as the new offset of the secondary request; and 3) when the type of the box read from the remaining binary data is a mdat box, the sum of the size of the mdat box and the size of the ftyp box is calculated as a new offset of the secondary request, and the binary data is requested from the server for the second time at the set size.

Therefore, regardless of the encapsulated structure of the media file, namely regardless of the encapsulation sequence of the file type box, the metadata box and the media data box in the media file, the metadata in the metadata box can be obtained from the server by the player at most two requests, and the metadata acquisition efficiency is improved.

As an example, for an MP4 file, the binary data returned by a server has a piece of binary data from zero bytes corresponding to an ftyp box according to the encapsulation standard of the MP4 file, and the size (i.e. length) of the ftyp box and the size of a complete MP4 file can be read from the header of the ftyp box according to the encapsulation standard of the header of the box; assuming that the size of the ftyp box is a (in bytes), the header information of the subsequent box is read from a +1 to obtain the type and size of the subsequent boxes; and if the ftyp box obtained from reading is followed by the moov box, and the size of the remaining binary data (setting the size–the size of the ftyp box) is larger than the size of the moov box, it is indicated the complete binary data of the moov box has been retrieved, and the metadata in the moov box can be extracted from the remaining binary data according to the offset and size of the moov box.

After acquiring metadata encapsulated in a metadata box from a server, a player parses a nested structure of sub-boxes in the metadata box, and reads out binary data in each sub-box according to the nested structure of the sub-boxes; and parses the media information of the media data characterized by each sub-box from the read binary data. In a practical application, the media information may include information about offset, size, decoding time, etc. for video frames and/or audio frames in the media file.

Taking the media file MP4 file as an example, the metadata box is a moov box; referring to FIG. 2, it can be seen that an mvhd box and a track box are encapsulated in the moov box, wherein information such as creation time, modification time, time measurement scale, playable duration, default volume and the like of the MP4 file can be obtained by parsing binary data of the mvhd box; the moov box includes a plurality of track boxes for recording description information specific to each media track; for example, for a video track box, a plurality of sub-boxes are nested in multiple layers in the video track box, video frame information and corresponding picture information of an MP4 file is obtained by parsing corresponding binary data based on a nested structure of the video track box.

In one embodiment, the player can parse the acquired metadata to obtain media information in the following manner sequentially parsing binary data corresponding to a standard length of the box header in the binary data of the metadata box to obtain the box type of the sub-box in the metadata box and the length of the box data of the sub-box; calling a parser of a type corresponding to the box type of the sub-box, sequentially parsing binary data corresponding to the length of the box data in unparsed data to obtain media information represented by the box data.

For the situation that a plurality of sub-boxes are nested in the metadata box, the offset of the binary data read by the player each time is a sum of the lengths of the sub-boxes identified, and the length of the read binary data conforms to the standard length of the box header, so that the type and length of the currently processed sub-box can be parsed.

For example, when reading for the first time, binary data is read from zero bytes of binary data of a metadata box, wherein the length of the read binary data conforms to the standard length of the box header, so that the type and length of a first sub-box can be parsed; when reading for the second time, the binary data starts to be read by taking the length of the first-read sub-box as an offset, and the length of the read binary data conforms to the standard length of the box header, so that the type and length of the second sub-box can be parsed.

According to the above manner for reading the binary data, neither the situation of returning back due to multiple reads of the binary data, nor the situation that the binary data is read again due to less reads will occur, so as to guarantee the parse efficiency and the accuracy.

In one embodiment, a typical box type nested within a metadata box is pre-labeled to indicate whether the box is directly used to encapsulate binary data or is further encapsulated with a box. For example, the mvhd box, audio track box, video track box, and other labels shown in FIG. 2 are further encapsulated with a box, and the stts box, stsd box, and other labels shown in FIG. 2 are directly encapsulated with binary data.

For the box type labeled as directly encapsulating binary data, a parser is set corresponding to the box type one to one, wherein the parser is used for parsing the represented media information according to the binary data; the parsed box type of the sub-box is compared with the pre-labeled box type, relating to the following two cases.

Case 1) when it is determined by comparison that the box type of a sub-box is pre-labeled and pre-labeled to directly encapsulate binary data, a parser corresponding to the box type of the sub-box is called, and the box data in the sub-box is parsed by the parser to obtain media information represented by the box data.

Case 2) when it is determined by comparison that the box type of a sub-box is pre-labeled and pre-labeled for continuing to encapsulate the box, binary data corresponding to the sub-box is recursively parsed according to the standard length of the box header in the media file until the box type of the box encapsulated in the sub-box is pre-labeled and pre-labeled to directly encapsulate the binary data, and a parser corresponding to the box type of the box encapsulated in the sub-box is called for parsing the binary data byte by byte, wherein the length of the parsed binary data corresponds to the length of the box data of the box encapsulated in the sub-box so as to obtain media information represented by the box data of the box encapsulated in the sub-box.

In one embodiment, a method for recording media information in a process of parsing a metadata box is described. When binary data corresponding to a standard length of a box header in the binary data of a metadata box is sequentially parsed to obtain a box type of a sub-box in the metadata box; an object is established according to a nested relationship between the sub-box and the box to which the sub-box belongs and a nested relationship between the sub-box and the box encapsulated in the sub-box; when the box type of a sub-box is pre-labeled to directly encapsulate binary data, an array including media information is stored in an object created corresponding to the sub-box, the stored media information being represented by box data of the sub-box.

For example, in FIG. 2, when the type of the parsed sub-box is stts box, since the stts box is pre-labeled to directly encapsulate binary data, an array including media information, which is duration information represented by the box data of the stts box, is stored in an object established corresponding to the stts box.

In one embodiment, the manner in which nested relationships between sub-boxes are recorded in the process of parsing a metadata box is described. When binary data corresponding to a standard length of a box header in binary data in metadata box is sequentially parsed to obtain a box type of a sub-box in the metadata box; if the box type is pre-labeled to directly encapsulate binary data, the parsed sub-box is recorded in the called parser; an instance of the recorded sub-box is set into a sub-box attribute, which is included in a box to which the sub-box belongs, for describing a nested relationship between the sub-box and the box to which the sub-box belongs.

For example, in FIG. 2, when the type of the parsed sub-box is the stsd box, since the stsd box is pre-labeled to directly encapsulate binary data, the stsd box is recorded in the parser corresponding to the stsd box, the instance of the stsd box is set to the stbl box sub-box attribute, and so on, and finally a stsd box, a stts box and a stsc box and other multiple sub-boxes nested in the sub-box of the stbl box are recorded in the sub-box attribute of the stsd box.

In one embodiment, when it is determined by comparison that the box type of the sub-box is not pre-labeled or is pre-labeled to directly encapsulate binary data while the parser of the corresponding type is not called, the binary data corresponding to parse the sub-box is ignored, and the part corresponding to a next sub-box in the binary data is skipped to continue parsing according to the length of the sub-box.

In practical application, a customized box type appears in a media file; the overall parsing progress of a metadata box is not affected in a skip mode; meanwhile, when the box type of the metadata box changes, compatible parsing of the latest metadata box can be quickly realized by adding, deleting and modifying a corresponding type of parser by setting the parser, which has the characteristics of flexibility and rapidness in upgrading.

Based on the above description for the media information identification, the following description for determining the offset and size of the media data in the media file based on the identified media information is made. In one embodiment, the player may determine the offset and size of the media data in the media file in the following manner: based on the identified media information, determining an offset and size of a video frame of the media data (i.e. a video frame between a first key frame and a second key frame) in the media file, and an offset and size of an audio frame aligned with the video frame in the media file; according to the determined offset and size, determining the offset and size of a target interval (an interval formed by a minimum offset and a maximum size) comprising the video frame and the audio frame; wherein the target interval includes the above video frame and audio frame.

Here, the manner in which audio frames and video frames are aligned in the embodiments of the present disclosure is described. Time-synchronized audio frames are positioned in the video frames according to the start time and duration of the media data on the basis of the video frames to ensure that the decoding start time of the first audio frame in the media data is not later than the decoding start time of the first video frame, and the decoding time of the last audio frame is not earlier than the decoding end time of the last video frame, so that the problem of inconsistent video and audio durations in the media files can be overcome, synchronous audio playing is guaranteed when each frame of video is played, and the phenomenon that pictures do not sound is avoided.

Next, the offset and size for determining the target interval are explained, including positioning the position of the video frame in the metadata box by the offset and size of the video frame in the media file between the first key frame and the second key frame in the two key frames, positioning the position of the audio frame in the metadata box by the offset and size of the audio frame aligned with the video frame in the media file, and taking an interval formed by an upper limit and a lower limit of the position as a target interval, the interval formed by a minimum offset and a maximum size; wherein the offset and size corresponding to the upper limit of the position are the offset and size corresponding to the upper limit of the target interval, and the offset and size corresponding to the lower limit of the position are the offset and size corresponding to the lower limit of the target interval. In practical applications, the target interval is the smallest interval in which video frames and audio frames are stored in the media data box of the target resolution media file, for example, an offset of the video frame between the first key frame and the second key frame at the position of the target resolution media file corresponds to an interval [a, b] (the address is in ascending order), an offset of the audio frame at the position of the target resolution media file corresponds to an interval [c, d] (the address is in ascending order), and then an interval formed by the upper limit and the lower limit of the position is [min (a, c); max (b, d)]. Thus, the player sends a network request carrying the offset and size of the target interval to the server so as to request the media data of the target interval, the server extracts the media data in the media file based on the offset and size of the target interval and returns the media data of the target interval at one time without secondary acquisition, so that the request times of the player are reduced, and the processing efficiency is improved.

Step 202: constructing a segmented media file based on the media data between the two key frames In one embodiment, a player may construct a segmented media file in the following manner the player calculates the metadata of the level of the segmented media file based on the identified media information, and fills the calculated metadata and the obtained media data based on the encapsulation format of the segmented media file to obtain the corresponding segmented media file.

Figure 8:
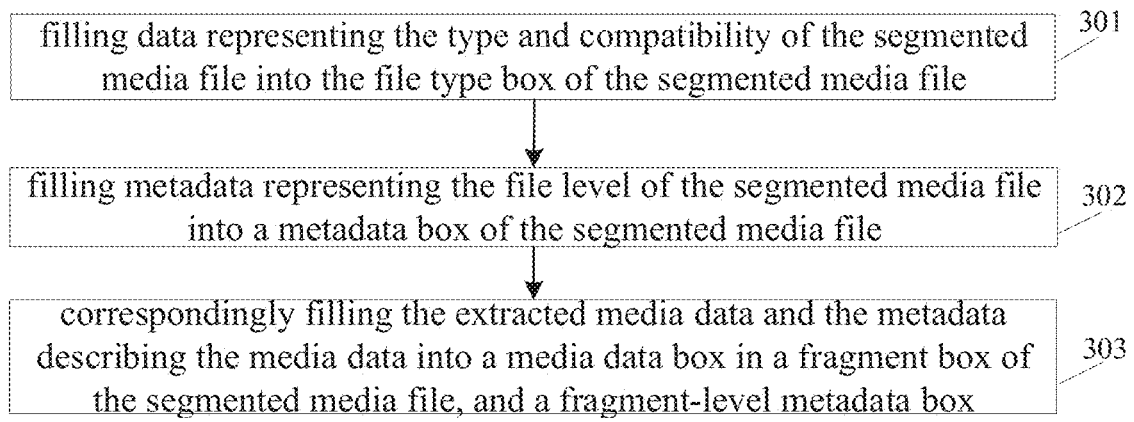
FIG. 8 is a flow diagram for encapsulating segmented media file provided by an embodiment of the present disclosure.

In one embodiment of the present disclosure, with reference to FIG. 8, it is an alternative flow diagram of an encapsulated segmented media file provided by an example of the present disclosure, which will be described in conjunction with the steps shown in FIG. 8.

Step 301: filling data representing the type and compatibility of the segmented media file into the file type box of the segmented media file.

For example, taking the FMP4 file encapsulated to form the encapsulated structure shown in FIG. 4 as an example, the type and length (representing the overall length of the ftyp box) of the box are filled into the file type box of the FMP4 file, i.e., the header of the ftyp box, and data (binary data) representing the file type as FMP4 and a compatible protocol are generated by filling in the data portion of the ftyp box.

Step 302: filling metadata representing the file level of the segmented media file into a metadata box of the segmented media file In one embodiment, the metadata describing the media data required to fill the nested structure is calculated according to the media data to be filled into the encapsulated structure of the segmented media file and according to the nested structure of the metadata box in the segmented media file.

Still taking FIG. 4 as an example, the metadata representing the file level of the FMP4 file is calculated and filled into a metadata box (i.e., a moov box) of the FMP4, and three boxes mvhd, track, and video extension (mvex) are nested in the moov box.

The metadata encapsulated in the mvhd box is used for representing media information related to the playing of the segmented media file, including position, time length, creation time, modification time and the like; the sub-boxes nested in the track box represent references and descriptions of corresponding tracks in the media data, for example, a box (denoted as a tkhd box) describing characteristics and general information (such as duration, width and height) of a track, and a box (denoted as a mdia box) recording media information (such as media type and sample information) of a track are nested in the track box.

Step 303: correspondingly filling the extracted media data and the metadata describing the media data into a media data box in a fragment box of the segmented media file, and a fragment-level metadata box.

In one embodiment, one or more fragments may be encapsulated in a segmented media file, and the media data to be filled may be filled into one or more segmented media data boxes (i.e., mdat boxes) of the segmented media file, each fragment having encapsulated therein a fragment-level metadata box (noted as a moof box), wherein the filled metadata is used to describe the media data filled in the fragment, enabling the fragments to be decoded independently.

Combined with FIG. 4, filling the media data to be filled into two fragments of the encapsulated structure of the FMP4 file is taken as an example to fill the media data into each fragment; the metadata that needs to be filled into a fragment-level metadata box (i.e., a moof box) of the corresponding fragment is calculated and correspondingly filled into a sub-box nested in moof box, which is called a moof box at the header of the moof box, and the filled binary data is used for indicating the type of the box as "moof box" and the length of the moof box.

In one embodiment of filling data into corresponding boxes in steps 301 to 303, when a filling operation is performed, a write operation function of class is called to complete writing and merging of binary data in a memory buffer of the sub-box, and an instance of the class is returned for merging the sub-box with a sub-box having a nested relationship.

As an example of filling data, it includes establishing a class MP4 for realizing an encapsulation function, and encapsulating each sub-box in a segmented media file into a static method of a class Stream; establishing a class Stream for realizing a binary data operation function, wherein each class Stream is provided with a memory buffer for storing binary data to be filled; converting multi-byte decimal data to be filled into binary data by a static method provided by Stream; combining and filling binary data to be filled into a sub-box in a memory buffer by a write operation function provided by a class Stream example; wherein the static method provided by Stream returns a new Stream instance to merge the current sub-box with other sub-boxes with nested relationships.

Step 203: adding the constructed segmented media file to a media source object in a media resource extension interface.

Figure 9:
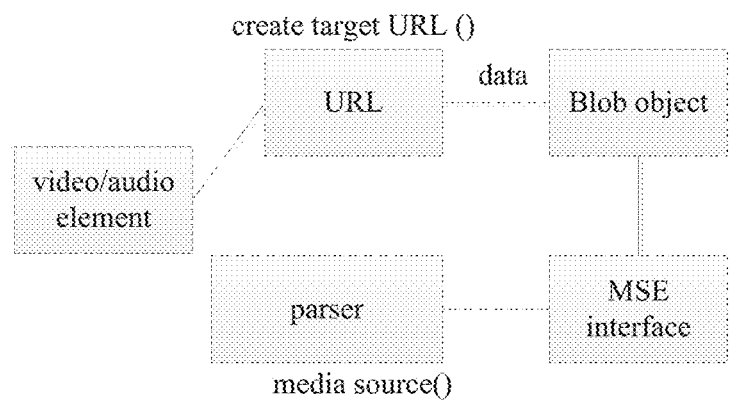
FIG. 9 is a schematic diagram of playing a segmented media file via a media source extension interface of a webpage by a player provided by an embodiment of the present disclosure.

Referring to FIG. 9, it is an alternative schematic diagram of a player playing a segmented media file via a media source extension interface of a webpage provided by the embodiment of the present disclosure; when receiving a playing event of the media file in a playing window (the player corresponding to the playing window) in the webpage, the player creates a media source object by the MSE-executed MediaSource method, and executes an addSourceBuffer method encapsulated in the media source extension interface to create a cache of a MediaSource object, namely a SourceBuffer object, wherein one MediaSource object has one or more SourceBuffer objects, and each SourceBuffer object can be used for a playing window in a corresponding webpage and for receiving a segmented media file to be played in the window.

In the playing process of the media file, a parser in a player continuously constructs a new segmented media file by parsing newly acquired media data, and adds the segmented media file to a SourceBuffer object of the same MediaSource object by executing an appendBuffer method of the SourceBuffer object.

After the player adds the constructed segmented media file to the media source object in the media resource extension interface, the media resource extension interface is called to create a virtual address corresponding to the media source object. For example, the player executes the createObjectURL method encapsulated in the media source extension interface, creates a virtual address corresponding to the media source object, i.e., a virtual Uniform Resource Locator (URL), in which a Blob-type segmented media file is encapsulated.

In addition, the player sets the MediaSource object with a source (src) attribute of the virtual URL, i.e., binds the virtual URL to media elements in the webpage, such as a video/audio element, and the process is also referred to as associating the media source object to the media elements in the webpage.

In the embodiment of the present disclosure, the segmented media file added to the media source object is a currently played segmented media file. For example, a segmented media file 1 is currently played, and subsequent segmented media files 2, 3 have been constructed; the constructed segmented media files 2, 3 will be added to the Source Buffer of the MSE for preloading, and accordingly, the first key frame of the two key frames corresponding to the media data acquired by the player is the first key frame occurring after the segmented media file 1.

Step 204: delivering a virtual address to the media elements of the webpage, wherein the virtual address is used for the media elements to decode and play with the media source object as a data source For example, the player includes a statement that calls the media elements to play the virtual URL, such as, <audio> virtual URL. When the browser interprets the corresponding statement in the player embedded in the webpage, the media elements of the browser are enabled to read the segmented media file from the SourceBuffer object bound by the virtual URL, and the segmented media file is decoded and played.

Next, the process of converting the MP4 file into the FMP4 file by the player and playing the FMP4 file on the webpage via the media source extension interface will be described.

Figure 10:
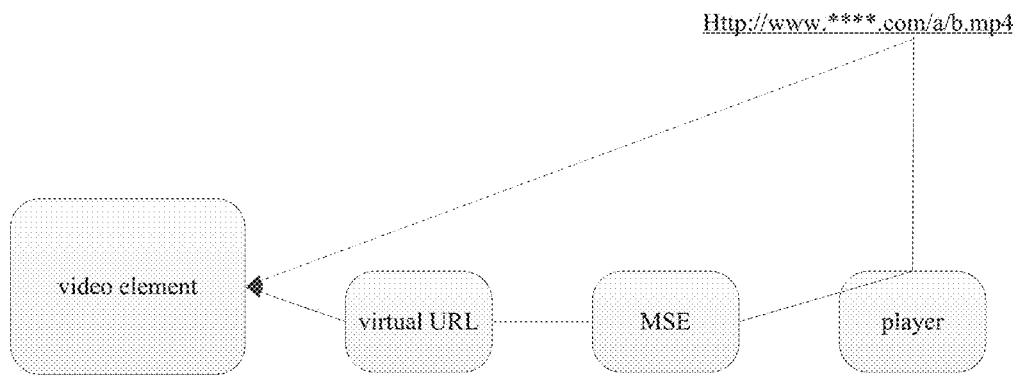
FIG. 10 is a schematic diagram in which a MP4 file is converted to an FMP4 file and played via a media source extension interface provided by an embodiment of the present disclosure.

Referring to FIG. 10, it is a schematic diagram for converting an MP4 file into an FMP4 file and playing the FMP4 file via a media source extension interface provided by the embodiment of the present disclosure, wherein a player, based on a real address (http://www.touitao.com/a/b.mp4) of media file, requests to obtain part of media data in the MP4 file from the server, e.g. data of which decoding time is at a given time period for subsequent play points.

The player constructs the FMP4 file based on the acquired media data, and then adds the FMP4 file to the SourceBuffer object corresponding to the MediaSource object. Since the virtual URL is bound to the MediaSource object, when the player calls the code of the audio/video element to be executed, the audio/video element reads the continuously added new FMP4 file from the SourceBuffer object of the MediaSource object and decodes the new FMP4 file to realize continuous playing of the media file. The media elements of the webpage acquire the media source object based on the virtual URL so as to play the media file instead of acquiring the media data based on the real address of the media file, thereby realizing the protection for the real address of the media file.

Figure 11:
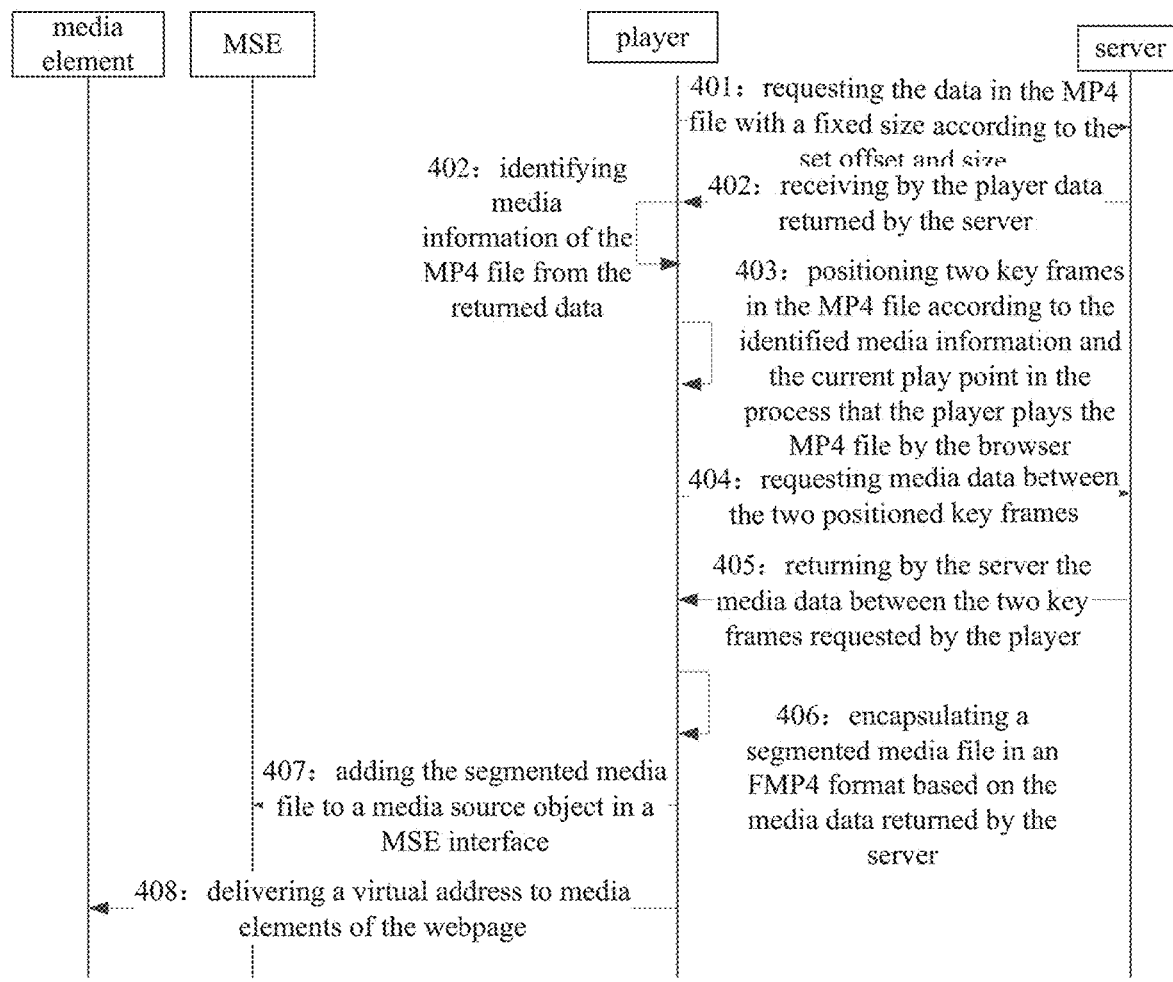
FIG. 11 is a flow diagram II showing a webpage playing method for a non-streaming media file provided by an embodiment of the present disclosure.
Figure 12:
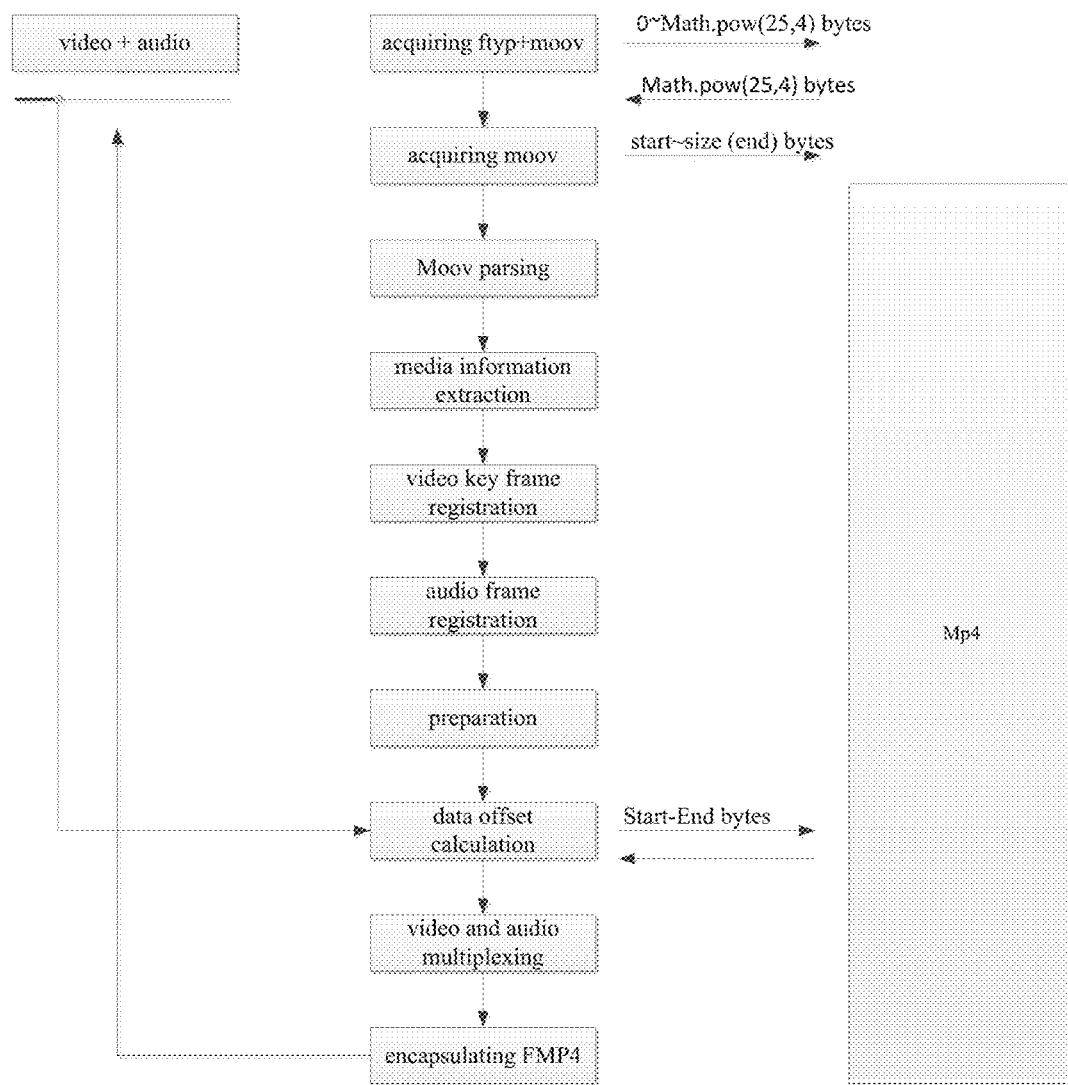
FIG. 12 is a flow diagram III showing a webpage playing method for a non-streaming media file provided by an embodiment of the present disclosure.

Next, for example, a player is embedded in a webpage of a browser, the webpage implements a player example by parsing and executing JS codes of the player, the player plays an MP4 file by using HTML5 media elements (video elements+audio elements) of the browser, the webpage playing method for the non-streaming media file in the embodiment of the disclosure is described, and the method can be easily applied to other non-streaming media formats according to the implementation of MP4. FIG. 11 illustrates an alternative flow diagram of a webpage playing method for a non-streaming media file provided by an embodiment of the present disclosure, and FIG. 12 illustrates another alternative flow diagram of a webpage playing method for a non-streaming media file provided by an embodiment of the present disclosure. With reference to FIGS. 11 and 12, the webpage playing method for the non-streaming media file provided by the embodiment of the present disclosure includes:

Step 401: requesting by the player the data in the MP4 file with a fixed size from the server according to the set offset and size The player sends a data request carrying the set offset and size to the server so as to obtain binary data starting from zero bytes and meeting the set size in the MP4 file. Taking the encapsulated structure of the MP4 file including sequentially encapsulated fytp box, moov box and mdat box as an example, the set size can be obtained according to the ftyp box and moov box size statistics of the existing MP4 file, so that the set size can cover the sum of the ftyp box and moov box of a set proportion (e.g., all) of the MP4 file, thereby ensuring that complete moov box binary data can be requested from a server at one time. Referring to FIG. 12, the player requests binary data with a set offset of 0 bytes and a set size of Math. pow (25, 4) bytes, acquires moov data from the binary data returned by the server, and if the complete moov data is not acquired by one request, recalculates the offset (start in FIG. 12) and the size (start-size), and then requests a second time.

Step 402: receiving by the player the data returned by the server and identifying the media information of the MP4 file from the data returned by the server The media information of the MP4 file includes information such as offset, size, decoding time of video/audio frames in the MP4 file.

In one embodiment, the player can identify media information of an MP4 file in the following manner binary data of the fytp box is identified from the data returned by the server, and the type and size of the box is read from the remaining binary data; when the type of the read box is a moov box, and the size of the remaining binary data is not smaller than the size of the moov box, the media information is parsed from the remaining binary data. Here, for the binary data returned by the server, the initial piece of binary data must correspond to the ftyp box; and according to the encapsulation standard of the ftyp box, the size (i.e. length) of the ftyp box and the size of the complete MP4 file can be read; for example, if the size of the ftyp box is a (in bytes), the header information of the subsequent box is read from a +1 to obtain the type and size; if for a moov box and the size (setting the size−the size of the ftyp box) is larger than the size of the moov box, it is indicated that the complete binary data of the moov box has been retrieved, the binary data can be parsed according to the encapsulated structure to restore the media information.

In one embodiment, when the binary data returned by the server does not include complete moov data, the size of the box is read from the acquired binary data, and the offset and size of the moov box in the MP4 file are determined; according to the determined offset and size, when the type of the box read from the remaining binary data is a moov box and the size of the remaining binary data is not smaller than the size of the moov box, the moov data which starts with the offset of the moov box in the MP4 file in the MP4 file and conforms to the size of the moov box in the MP4 file is obtained from the server; when the type of the box read from the remaining binary data is a moov box, and the size of the remaining binary data is smaller than the size of the moov box, the difference between the size of the moov box and the size of the remaining binary data is calculated as a new size for the secondary request, and the binary data is requested from the server for the second time with the sum of the offset and the size requested for the first time as a new offset.

In practical application, there is a case in which the encapsulated structure of the MP4 file is a fytp box, a mdat box, and a moov box sequentially encapsulated; when the type of the box read from the remaining binary data is a mdat box, the sum of the size of the mdat box and the size of the moov box is calculated as a new offset for the second request, and the binary data is requested from the server for the second time at the set size.

Step 403: positioning two key frames in the MP4 file according to the identified media information and the current play point in the process that the player plays the MP4 file by the browser In the embodiment of the disclosure, the player plays the media data (at least including video data and may further including audio data) between the two key frames as a load unit, i.e. the player plays the MP4 file by loading the media data between the two key frames, and only a general frame can exist between the two key frames, i.e. the two key frames are adjacent key frames, and other key frames may also exist between the two key frames.

Taking the play point in the MP4 file reached by means of skipping as an example, referring to FIG. 12, the player first determines the key frames, i.e. video key frame registration, and the player positions the first key frame as a first key frame with the decoding time before the play point in the MP4 file, and positions the second key frame as a key frame have a decoding time later than the first key frame in the MP4 file. Here, the video frame of the media file corresponding to the play point includes both the general frame and the key frame; and when the video frame corresponding to the play point is just the key frame, the first key frame having a decoding time before the play point in the MP4 file is the key frame corresponding to the play point, that is, the first key frame in the media data requested by the player is the key frame corresponding to the play point.

The positioning the two key frames in the MP4 file by the player includes determining the offset and size (calculated corresponding to the data offset in FIG. 12) of the first key frame and the second key frame based on the identified media information and the current play point, and then requesting the media data between the first key frame and the second key frame from the server based on the offset and size.

Step 404: requesting media data between the two positioned key frames from the server In actual implementation, a player sends a network request to a server to request media data between two key frames positioned in an MP4 file, wherein the network request carries offset and size of a target interval corresponding to the two key frames.

Here, the player positions a video frame in mdat by the offset and size of the video frame between the first key frame and the second key frame in the MP4 file, and positions an audio frame in mdat (registered corresponding to the audio frame in FIG. 12) by the offset and size of the audio frame aligned with the video frame in the MP4 file; by taking an interval formed by an upper limit and a lower limit of a position as a target interval (corresponding to video and audio multiplexing in FIG. 12), the offset and size corresponding to the upper limit of the position are the offset and size corresponding to the upper limit of the target interval, and the offset and size corresponding to the lower limit of the position are the offset and size corresponding to the lower limit of the target interval.

Step 405: returning by the server the media data between the two key frames requested by the player Step 406: encapsulating a segmented media file in an FMP4 format based on the media data returned by the server In actual implementation, the server calculates the metadata of the segmented media file level according to the media information of the media data, and then fills the metadata of the segmented media file level and the media data according to the encapsulation format of the segmented media file in the FMP4 format to obtain the segmented media file in the FMP4 format.

Step 407: adding the segmented media file to a media source object in a MSE interface Step 408: delivering a virtual address to media elements of the webpage The virtual address is used for the media elements (a Video element and an Audio element) to play with the media source object as a data source.

The application of embodiments of the disclosure has the following beneficial effects.

1) The player acquires part of media data between two key frames of the media file to construct and play a segmented media file, so that the media data loading is controlled in the process of playing the media file to avoid unnecessary consumption of the traffic and bandwidth.

2) The media data in the media file in a non-streaming media format is converted into a segmented media file, and the segmented media file is sent to media elements of the webpage via a media source extension interface of the webpage for decoding and playing, so that the media file in the non-streaming media format is played by the webpage, and the limitation that the non-streaming media files in a encapsulation format can be independently played only after being completely downloaded is overcome.

3) The encapsulated segmented media file is based on part of the media data of the acquired media file instead of all data of the media file, so that the conversion delay is small, pre-storage is not needed, extra storage space is not occupied except the original media file, and the occupation of the storage space is remarkably reduced.

4) The media elements of the webpage acquire the segmented media file via the media source extension interface for decoding and playing, rather than acquiring media data and then playing based on the real address of the media file, and the protection for the real address of the media file is realized.

Figure 13:
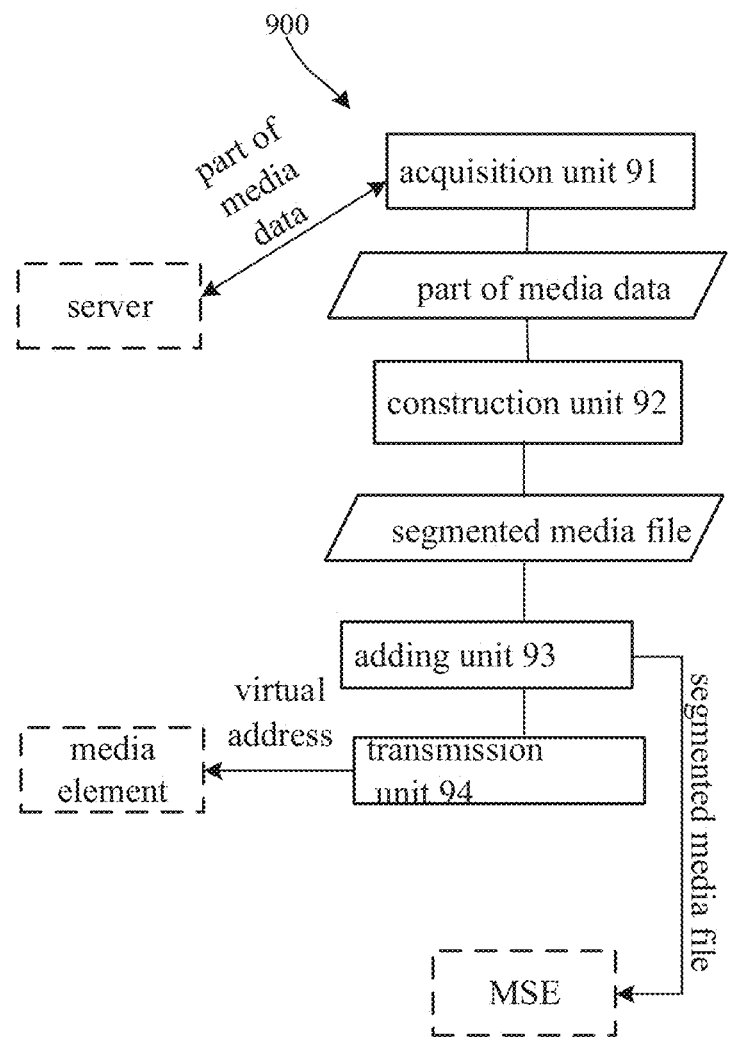
FIG. 13 is a schematic diagram II showing a composition structure of a webpage playing device for a non-streaming media file provided by an embodiment of the present disclosure.

Next, it will continue with the description of the webpage playing device for the non-streaming media file. As an example of a hardware or software implementation of the webpage playing device for the non-streaming media file, the webpage playing device for the non-streaming media file may be provided as a series of modules having a coupling relationship at the signal/information/data level, which will be described below in conjunction with FIG. 13. With reference to FIG. 13, it is an alternative composition structure of a webpage playing device for a non-streaming media file provided by an embodiment of the present disclosure. The webpage playing device implementing the non-streaming media file is shown to include a series of units, but the unit structure of the webpage playing device implementing the non-streaming media file is not limited to that shown in FIG. 13, for example, the units therein may be further divided or combined according to different functions implemented. Referring to FIG. 13, the webpage playing device 900 for the non-streaming media file includes: an acquisition unit 91 configured to acquire part of media data in the media file based on two key frames of a media file played in a webpage, wherein the media file is in a non-streaming media format; a construction unit 92 configured to construct a segmented media file based on the media data between the two key frames; an adding unit 93 configured to add the constructed segmented media file to a media source object in a media resource extension interface; a transmission unit 94 configured to deliver a virtual address to media elements of the webpage, wherein the virtual address is used for the media elements to play with the media source object as a data source.

In one embodiment, when the play point of the media file is reached by means of continuous playing, the first key frame of the two key frames is: the first key frame whose decoding time is after the play point in the media file; the second key frame of the two key frames is a key frame whose decoding time is later than the first key frame in the media file.

In one embodiment, when the play point of the media file is reached by skipping, the first key frame of the two key frames is the first key frame whose decoding time is before the play point in the media file, the second key frame of the two key frames is a key frame whose decoding time is later than the first key frame in the media file.

In one embodiment, the acquisition unit is also configured to determine the offset and size of the video frame between the two key frames in the media file and the offset and size of the audio frame aligned with the video frame in the media file according to the media information recognized from the media file; determining the offset and size of the target interval including the video frame and the audio frame according to the determined offset and size; based on the offset and size of the target interval, the media data for constructing the segmented media file in the media data box of the media file is acquired.

In one embodiment, the acquisition unit is also configured to acquire metadata in the media file according to the set offset and size; identifying the media information from the acquired metadata; the media information is used to position the offset and size of the media data in the media file.

In one embodiment, the acquisition unit is also configured to calculate the offset and size of the metadata box according to the header of the metadata box when the complete media information is not recognized from the acquired metadata; obtaining metadata in the metadata box according to the calculated offset and size of the metadata box; the corresponding media information is identified from the metadata in the acquired metadata box.

In one embodiment, the construction unit is also configured to calculate the metadata of the corresponding segmented media file level according to the media information corresponding to the media data between the two key frames; the calculated metadata and the media data between the two key frames are filled based on the encapsulation format of the segmented media file to obtain the corresponding segmented media file.

The embodiment of the disclosure also provides a readable storage medium, which may include: mobile storage device, random access memory (RAM), read-only memory (ROM), disk or optical disc and other media that can store program code. The readable storage medium stores executable instructions; the executable instruction is used to realize the webpage playing method of the non-streaming media file when being executed by the processor.

The above is only the specific embodiment of the disclosure, but the protection scope of the disclosure is not limited to herein. Any one skilled in the technical field can easily make changes or replacements within the technical scope of the disclosure, and the changes or replacements should be covered in the scope of protection of the disclosure. Therefore, the protection scope of the disclosure shall be subject to the protection scope of the claims.

The invention claimed is:

1. A webpage playing method for non-streaming media files, comprising:
   acquiring a part of media data in a media file from a server based on two key frames of the media file to be played in webpage, wherein the media file is in a non-streaming media format;
   constructing a segmented media file based on the acquired media data between the two key frames, wherein the segmented media file is constructed by packaging the acquired media data and corresponding metadata based on an encapsulation format;
   adding the constructed segmented media file to a media source object in a media resource extension interface;
   creating a virtual address corresponding to the media source object by the media resource extension interface;
   binding the virtual address corresponding to the media source object to a media element in the webpage;
   delivering the virtual address to the media element in the webpage; and
   decoding the media source object using the virtual address by the media element in the webpage.

2. The method of claim 1, wherein when a play point of the media file is reached by means of continuous playing, the first key frame of the two key frames is the first key frame whose decoding time is after the play point in the media file;
   wherein the second key frame of the two key frames is a key frame whose decoding time is later than the first key frame in the media file.

3. The method of claim 2, wherein the constructing a segmented media file based on the media data between the two key frames comprises:
   calculating the metadata of the corresponding segmented media file level according to the media information corresponding to the media data between the two key frames;
   filling the calculated metadata and the media data between the two key frames based on an encapsulation format of the segmented media file to obtain the corresponding segmented media file.

4. The method of claim 1, wherein when a play point of the media file is reached by skipping, the first key frame of the two key frames is the first key frame whose decoding time is before the play point in the media file, the second key frame of the two key frames is a key frame whose decoding time is later than the first key frame in the media file.

5. The method of claim 4, wherein the constructing a segmented media file based on the media data between the two key frames comprises:
   calculating the metadata of the corresponding segmented media file level according to the media information corresponding to the media data between the two key frames;
   filling the calculated metadata and the media data between the two key frames based on an encapsulation format of the segmented media file to obtain the corresponding segmented media file.

6. The method of claim 1, wherein the acquiring a part of media data in a media file comprises:
   determining an offset and size of a video frame between the two key frames in the media file and an offset and size of the audio frame aligned with the video frame in the media file according to a media information recognized from the media file;
   determining an offset and size of a target interval including the video frame and the audio frame according to the determined off set and size;
   acquiring the media data for constructing the segmented media file in a media data box of the media file based on the offset and size of the target interval.

7. The method of claim 6, wherein the method further comprises:
   acquiring metadata in the media file according to the set offset and size;
   identifying the media information from the acquired metadata;
   wherein the media information is used to position the offset and size of the media data in the media file.

8. The method of claim 6, wherein the constructing a segmented media file based on the media data between the two key frames comprises:
   calculating the metadata of the corresponding segmented media file level according to the media information corresponding to the media data between the two key frames;
   filling the calculated metadata and the media data between the two key frames based on an encapsulation format of the segmented media file to obtain the corresponding segmented media file.

9. The method of claim 7, wherein the method further comprises:
   when the complete media information is not recognized from the acquired metadata, calculating an off set and size of a metadata box according to a header of the metadata box;
   obtaining metadata in the metadata box according to the calculated off set and size of the metadata box;
   identifying the corresponding media information from the metadata in the acquired metadata box.

10. The method of claim 7, wherein the constructing a segmented media file based on the media data between the two key frames comprises:
    calculating the metadata of the corresponding segmented media file level according to the media information corresponding to the media data between the two key frames;

filling the calculated metadata and the media data between the two key frames based on an encapsulation format of the segmented media file to obtain the corresponding segmented media file.

11. The method of claim 9, wherein the constructing a segmented media file based on the media data between the two key frames comprises:
calculating the metadata of the corresponding segmented media file level according to the media information corresponding to the media data between the two key frames;
filling the calculated metadata and the media data between the two key frames based on an encapsulation format of the segmented media file to obtain the corresponding segmented media file.

12. The method of claim 1, wherein the constructing a segmented media file based on the media data between the two key frames comprises:
calculating the metadata of the corresponding segmented media file level according to the media information corresponding to the media data between the two key frames;
filling the calculated metadata and the media data between the two key frames based on an encapsulation format of the segmented media file to obtain the corresponding segmented media file.

13. A webpage playing device for non-streaming media files, comprising:
at least one processor; and
at least one memory communicatively coupled to the at least one processor and storing instructions that upon execution by the at least one processor cause the device to:
acquire a part of media data in a media file from a server based on two key frames of the media file to be played in webpage, wherein the media file is in a non- streaming media format;
construct a segmented media file based on the acquired media data between the two key frames, wherein the segmented media file is constructed by packaging the acquired media data and corresponding metadata based on an encapsulation format;
add the constructed segmented media file to a media source object in a media resource extension interface;
create a virtual address corresponding to the media source object by the media resource extension interface;
bind the virtual address corresponding to the media source object to a media element in the webpage;
deliver the virtual address to the media element in the webpage; and
decode the media source object using the virtual address by the media element in the webpage.

14. The webpage playing device of claim 13, wherein when a play point of the media file is reached by means of continuous playing, the first key frame of the two key frames is the first key frame whose decoding time is after the play point in the media file;
wherein the second key frame of the two key frames is a key frame whose decoding time is later than the first key frame in the media file.

15. The webpage playing device of claim 13, wherein when a play point of the media file is reached by skipping, the first key frame of the two key frames is the first key frame whose decoding time is before the play point in the media file, the second key frame of the two key frames is a key frame whose decoding time is later than the first key frame in the media file.

16. The webpage playing device of claim 13, wherein the at least one memory further stores instructions that upon execution by the at least one processor cause the device to:
determine an offset and size of a video frame between the two key frames in the media file and an offset and size of the audio frame aligned with the video frame in the media file according to a media information recognized from the media file;
determine an offset and size of a target interval including the video frame and the audio frame according to the determined off set and size;
acquire the media data for constructing the segmented media file in a media data box of the media file based on the offset and size of the target interval.

17. The webpage playing device of claim 16, wherein the at least one memory further stores instructions that upon execution by the at least one processor cause the device to:
acquire metadata in the media file according to the set offset and size;
identify the media information from the acquired metadata;
wherein the media information is used to position the offset and size of the media data in the media file.

18. The webpage playing device of claim 17, wherein the at least one memory further stores instructions that upon execution by the at least one processor cause the device to:
calculate an off set and size of a metadata box according to a header of the metadata box when the complete media information is not recognized from the acquired metadata;
obtain metadata in the metadata box according to the calculated off set and size of the metadata box;
identify the corresponding media information from the metadata in the acquired metadata box.

19. The webpage playing device of claim 13, wherein the at least one memory further stores instructions that upon execution by the at least one processor cause the device to:
calculate the metadata of the corresponding segmented media file level according to the media information corresponding to the media data between the two key frames;
fill the calculated metadata and the media data between the two key frames based on an encapsulation format of the segmented media file to obtain the corresponding segmented media file.

20. A non-transitory storage medium for storing computer-readable instructions to perform operations when the non-transitory computer-readable instructions are executed by a computing device, the operations comprising:
acquiring a part of media data in a media file from a server based on two key frames of the media file to be played in webpage; wherein the media file is in a non-streaming media format;
constructing a segmented media file based on the acquired media data between the two key frames, wherein the segmented media file is constructed by packaging the acquired media data and corresponding metadata based on an encapsulation format;
adding the constructed segmented media file to a media source object in a media resource extension interface;
creating a virtual address corresponding to the media source object by the media resource extension interface;
binding the virtual address corresponding to the media source object to a media element in the webpage;

delivering the virtual address to the media element in the webpage, wherein the virtual address is used for the media element to play with the media source object as a data source.

* * * * *